(12) United States Patent
Ohara

(10) Patent No.: US 6,840,886 B2
(45) Date of Patent: Jan. 11, 2005

(54) METHOD AND APPARATUS FOR A LOW COST, HIGH SPEED, AND COMPACT NANOMETER PRECISION MOTION STAGE USING FRICTION DRIVE AND FLEXURE HINGE

(75) Inventor: Tetsuo Ohara, Sutton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 277 days.

(21) Appl. No.: 10/112,341

(22) Filed: Mar. 29, 2002

(65) Prior Publication Data
US 2003/0185592 A1 Oct. 2, 2003

(51) Int. Cl.⁷ .............................................. F16H 13/00
(52) U.S. Cl. ............................. 476/67; 476/61; 476/65
(58) Field of Search ............................. 476/67, 68, 69, 476/71, 61, 65, 66; 242/356.5, 396.8

(56) References Cited

U.S. PATENT DOCUMENTS 3,964,098 A * 6/1976 Kramer et al. ................ 360/93
4,917,368 A * 4/1990 LaBelle et al. ................ 271/21
5,140,242 A * 8/1992 Doran et al. ................. 318/640
6,466,324 B1 * 10/2002 Doran ......................... 356/500
2002/0150398 A1 * 10/2002 Choi et al. ................... 396/428

OTHER PUBLICATIONS

A. H. Slocum; "Precision Machine Design"; Prentice Hall, pp. 341, 416, and 700–705; 1992.

S. Sakuta et al.; Ultra–Precision Positioning By Friction Drive–Table Control for DVD Mastering Japan/USA Symposium on Flexible Automation, vol. 1, ASME 1996.

* cited by examiner

Primary Examiner—David Fenstermacher
(74) Attorney, Agent, or Firm—RatnerPrestia

(57) ABSTRACT

A friction drive including a drive shaft that is in rotational motion and in frictional contact with a follower at a contact area. The drive shaft transfers a thrust at the contact area. The follower receives the thrust and provides motion in response to the thrust. A flexure hinge couples the drive shaft to the follower with a constant force while restraining movement of the contact area in the direction of the thrust.

21 Claims, 4 Drawing Sheets

METHOD AND APPARATUS FOR A LOW COST, HIGH SPEED, AND COMPACT NANOMETER PRECISION MOTION STAGE USING FRICTION DRIVE AND FLEXURE HINGE

TECHNICAL FIELD

This invention relates to generally to a precision motion system, and more particularly to a method and apparatus for providing a low cost, high speed, and compact precision motion stage having nanometer-range resolution using a friction drive with a flexure hinge.

BACKGROUND OF THE INVENTION

Precision motion systems with resolutions in a range down to ten nanometers are required in many manufacturing applications, including assembly and alignment of optical transmission and processing equipment. Typically, precision motion is provided by a combination of a DC or AC servo motor, a high precision feedback encoder, and a high precision linear bearing or guide. A 6-axis motion control stage incorporating these sub-systems, however, can be very expensive. These sub-systems are also complicated, having a high part count that can cause reliability problems. Yet another problem with these systems is that they typically require speed reduction devices, such as gear sets or lead screws to create sufficient torque for many precision motion applications. Such speed reduction devices incorporate play or looseness of fit that can cause backlash and dead spots in the motion system, as well as, lateral forces that reduce the precision of the stage motion.

One alternative to these complicated precision systems is a motion system using a friction drive. Typically a friction drive comprises a drive shaft which is rotated by a power source, such as a motor, and a stage which moves in a linear direction, due to the frictional force (thrust) applied to it by the rotation of the shaft. A separate high-precision guide such as an air bearing or hydraulic bearing typically maintains the linear motion of the stage. Thus, the friction drive motor and the motion guide are connected through a bar or rod that is longer than the range of linear motion of the stage, reducing the system stiffness, and consequently, the stage motion resolution. The guide also increases the cost and complexity of the precision motion system.

Yet another problem with using a friction drive for a precision motion system is the need to provide a consistent pre-load force. Typically, the friction motor is fixed and the pre-load force is applied to the linear stage through back-up rollers. Back-up rollers, however, add weight, cost, size, and complexity to the precision motion system. The speed of precision motion systems may also be limited to maintain a consistent pre-load force on the friction drive.

Accordingly, a need exists for a precision motion system that is inexpensive and compact, and can operate at high speed with nanometer-range motion resolution.

SUMMARY OF THE INVENTION

The present invention provides a friction drive for providing precision motion. In an exemplary embodiment, the friction drive comprises a drive shaft and a follower in frictional contact. The drive shaft is in frictional contact at a contact area for imparting a thrust to the follower. The follower, provides a motion in response to the thrust. The drive shaft and follower are coupled by a flexure hinge that maintains a constant force between the drive shaft and follower while restraining the movement of the contact area in the direction of the thrust.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
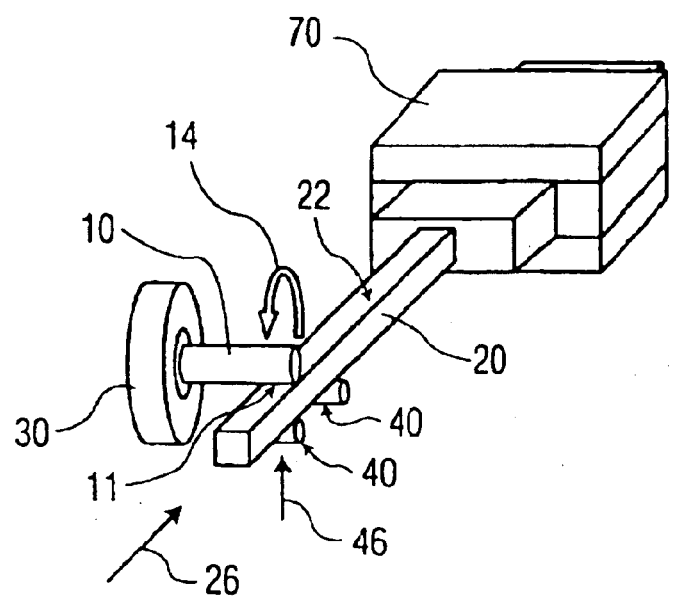
FIG. 1 is a prior art friction drive system.

Referring now to the drawing, in which like reference numbers refer to like elements throughout, FIG. 1 illustrates a friction drive system according to the prior art. A motor 30 is used to rotate a drive shaft 10 in a direction of rotation 14. A follower 20 has a friction surface 22, a portion of which is in contact with a contact area 11 of shaft 10. Backup rollers 40 apply a pre-load force 46 to follower 20 urging friction surface 22 toward shaft 10. Drive shaft 10 is constrained in a fixed position relative to follower 20, such as by a bearing (not shown). Accordingly, drive shaft 10 acts as a transmission member, generating a frictional force or thrust 26, by rotation of drive shaft 10 which is forced against friction surface 22. Thrust 26 acts on frictional surface 22 of follower 20 to provide motion to follower 20. Thrust 26 is proportional to pre-load force 46, and the motion of follower 20 is proportional to the angular displacement of shaft 10. A linear guide 70 controls the motion of follower 20 to maintain a linear displacement of follower 20. Linear guide 70 may be, for example, a hydraulic bearing or an air bearing.

When used in a precision positioning device, the prior art friction drive system described above has a problem. Linear guide 70 and backup rollers 40 add volume and weight to the friction drive system. In many applications for precision positioning devices, such as optics fabrication, space is very expensive, because the application must be performed in a clean-room environment. Increased size of the precision positioning device may also adversely affect the distance that component parts and completed assemblies must be transported to and from the precision positioning device, adding cost and complexity to a fabrication application. Also, the precision positioning device may be mounted on a second positioning device for alignment on a different axis, such that added weight adversely affects the thrust required in the second positioning device. Additionally, linear guide 70 and backup rollers 40 add cost to the system and, because they increase part count, may reduce system reliability.

Moreover, any linear guide induces some amount of motion error relative to an ideally straight line over its length of travel. Thus, the backup rollers either will not provide a constant force if alignment of the follower to a stationary shaft is not maintained at the contact area of drive shaft 100, or will induce stresses in follower 20 to maintain the alignment. Both conditions prevent smooth motion of follower 20, resulting in reduced positional resolution. Also, any movement of the contact area 101 in space translates into a repeatability error of the linear motion.

Figure 2:
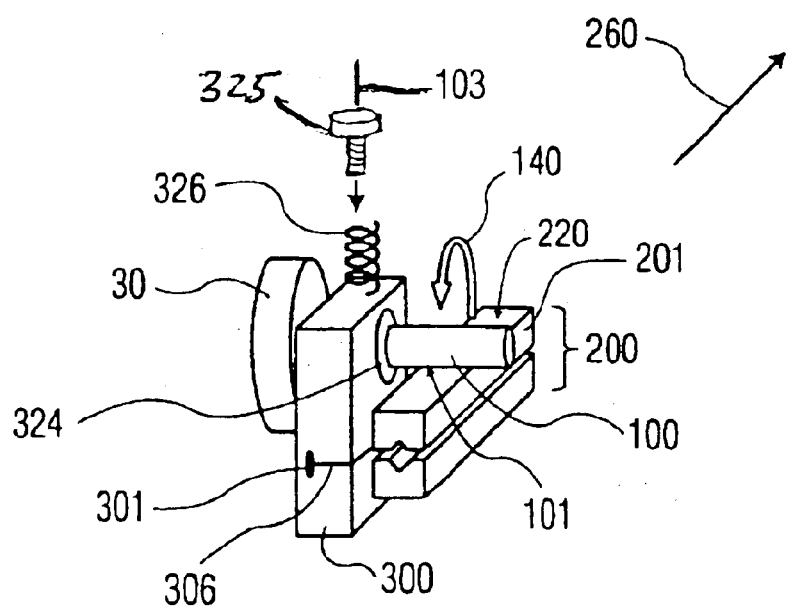
FIG. 2 is a friction drive system according to an exemplary embodiment of the present invention.

In an exemplary embodiment of present invention, as shown in FIG. 2, a drive shaft 100 is rotated by motor 30 in a direction of rotation 140. Drive shaft 100 has a contact area 101 that is in contact with a friction surface 220 of a follower 201. Follower 201 is a cross roller way of a linear bearing 200, and may be integral with a linear motion stage (not shown) or other device providing precision motion, or may be attached or fixed to such device. Drive shaft 100 is urged toward friction surface 220 by a pre-load force 103 applied through drive shaft 100. Pre-load force 103 causes a contact force between drive shaft 100 and friction surface 220 at contact area 101. The rotation of drive shaft 100 and this contact force cause a frictional force or thrust 260 acting on follower 201. Thrust 260 causes motion of follower 221. This motion is linearly constrained by linear bearing 200.

As shown in FIG. 2, drive shaft 100 is coupled to friction surface 220 at contact area 101 by flexure hinge 301. Flexure hinge 301 comprises an elongated thin wall section formed by creating a slot 306 in a support structure 300. The hinge 301 has a width that is thin enough to provide a range of motion of shaft 100 at contact area 101 sufficient to compensate for motion errors relative to an ideally straight line over the length of travel of follower 201. Slot 306, however, has a sufficiently small width to allow bending and avoid buckling of the thin wall section of flexure hinge 301. In an exemplary embodiment of the present invention, motion errors are less than 10 $\mu$m and slot 306 has a width which is minimized to prevent movement of the pivot point, to maximize hinge stiffness, and to avoid stresses which exceed the fatigue stress of the flexure hinge material while allowing a range of motion to accommodate motion errors in the linear bearing without significant variation in the applied force at the linear bearing. Slot 306 may be terminated with a rounded opening to reduce stress concentrations. In an exemplary embodiment of the invention, a slot width of less than 0.1 mm may be formed using wire elecro-discharge machining. The hinge thickness (i.e., of the remaining thin wall section of flexure hinge 301) may have a dimension that depends upon the forces acting on it, such as the weight of motor 30 and pre-load force 103, but ideally would be sufficient to allow a range of bending motion when the pre-load force is applied. In an exemplary embodiment of the invention, the thickness may be between about 0.6 mm and 1.25 mm. Support structure 300 may comprise various materials having a low coefficient of thermal expansion, high fatigue stress, and a sufficient elastic range for motion errors in a particular system. In an exemplary embodiment of the invention, stainless steel is used for support structure 300.

Flexure hinge 300 allows movement at contact area 101 of drive shaft 100 in the direction of pre-load force 103. Movement of contact area 101 of drive shaft 100 is restrained, however, in the direction of thrust 260 by flexure hinge 300. This is because the geometry of flexure hinge 300, an elongated thin wall section, provides much more resistance to a moment about an axis perpendicular to the length of flexure hinge 300 (e.g., movement of the shaft, in the direction of thrust 260) than to a moment about an axis along the length of flexure hinge 300 (e.g., movement of the shaft in the direction of pre-load force 103).

In the exemplary embodiment illustrated in FIG. 2, flexure hinge 301 is formed in support structure 300, which is a mount for motor 30. Motor 30 and drive shaft 100 are supported by a bearing 324, disposed in support structure 300. Pre-load force 103 is applied to support structure 300 so that a force moment acts at flexure hinge 301 equal to the force applied times the offset distance between the thin wall section of flexure hinge 301 and pre-load force 103. The force moment urges flexure hinge 301 closed (i.e., the slot width is reduced), and contact area 101 of drive shaft 100 is urged toward surface 220 of follower 201.

Pre-load force 103 may be applied to support structure 300 through a spring 326 to provide a uniform force over a range of motion of contact area 101. This range of motion of contact area 101 is ideally sufficient to follow errors of motion of follower 201 from an idealized straight line. As described above, this range of motion is limited to the direction normal to both surface 220 and contact area 101. In an exemplary embodiment of the present invention, spring 326 may be, for example, a spring washer such as a Bellville washer disposed beneath a head of a bolt 325 securing support structure 300.

In an exemplary embodiment of the present invention, motor 30 is a rotary ultrasonic motor, providing rotational impulses to drive shaft 100. It should be understood that rotational force may be provided by means other than a rotary ultrasonic motor, such as a rotary pneumatic actuator, a rotary hydraulic actuator, and the like. A rotary ultrasonic motor, however, provides a highly reliable angular displacement, particularly rotary ultrasonic motor model number USR30 from Shinsei Corp. of Tokyo, Japan, when driven by driver model number D6030 also from Shinsei Corp. This highly reliable angular displacement improves the positional resolution of follower 201 in an exemplary precision motion stage.

The diameter of drive shaft 100 is minimized to maintain positional resolution. The positional resolution is reduced by angular uncertainty in rotary ultrasonic motor 30. Accordingly, as the diameter decreases, the angular uncertainty translates to a smaller positional uncertainty of follower 201 and positional resolution improves. In an exemplary precision motion stage, the diameter of drive shaft 100 is less than about 5.25 mm and achieves a step resolution of less than 10 nm. Decreasing the diameter of drive shaft 100 also increases the thrust 260, and increasing the diameter of drive shaft 100 increases the motion speed of follower 201.

Drive shaft 100 comprises a material having sufficient strength for the torsional load and pre-load necessary to achieve the desired thrust. The material also desirably has a sufficient stiffness to prevent deformation under the torsional load of motor 30 and the pre-load 103. In an exemplary precision motion stage, drive shaft 100 comprises a heat-treated stainless steel.

Linear bearing 200 may be any bearing configured to restrain a moving member to an essentially linear movement. In an exemplary precision motion stage, linear bearing is a CRW series bearing manufactured by IKO Nippon Thompson Co., Ltd. of Tokyo, Japan.

Figure 3:
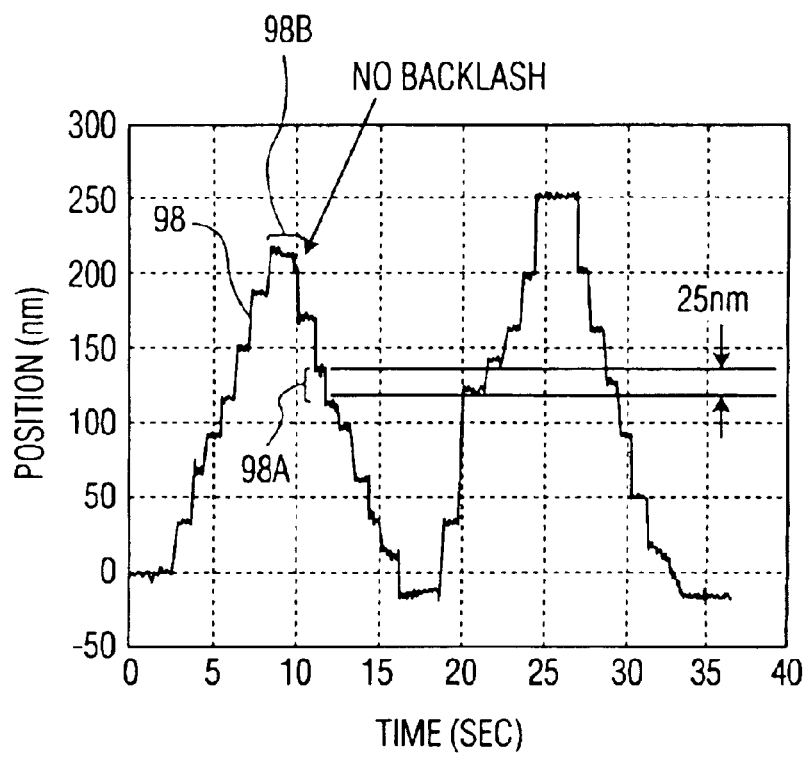
FIG. 3 shows test results of the friction drive system of FIG. 2 for open loop step motion resolution testing.
Figure 4:
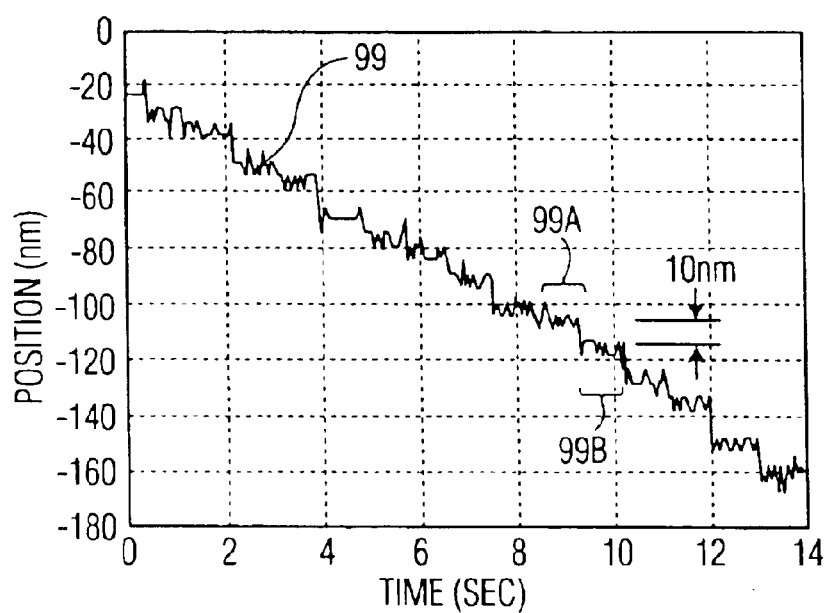
FIG. 4 shows test results of the friction drive system of FIG. 2 for minimum step motion testing.

FIGS. 3 and 4 show test results for a precision motion stage using a friction drive coupled with a flexure hinge according to an embodiment of the present invention as described above. In FIG. 3 a linear offset or position is plotted over time for the precision motion stage, shown as position curve 98. The position of the precision motion stage is determined using a laser interferometer (Model HP5517B, HP1070F from Hewlett-Packard of Palo Alta, Calif.). As shown at location 98A, the precision motion stage moves in 25 nm steps. At location 98B, the direction of travel for the precision motion stage changes. In the testing a toggle switch was used to manually alter the direction of motion by altering the phase of a sinusoidal voltage applied to drive the ultrasonic motor providing rotation to the drive shaft. The position curve is responsive to a motion command without any disturbance at location 98A, demonstrating that the precision motion stage does not suffer from backlash, dead spots, spring back, or the like. Backlash or dead spots would appear on position curve 98 as a delay in the curve prior to stepping in the opposing direction. Torsional spring back would appear on position curve 98 as an accelerated motion when the motion direction is switched.

In FIG. 4 linear offset or position is plotted over time for minimum step testing as minimum step curve 99. A step motion command is sent to the motor driver at 900 msec. intervals. A background noise on the order of 5 to 15 nm from the laser interferometer appears on minimum step curve 99. The system, however, can stably resolve better than 10 nm as demonstrated by the 10 nm step in position between the stage position represented by location 99A and the position represented by location 99B on minimum step curve 99.

The precision motion stage used in the testing described above provides resolution of better than 10 nm without dead spots or backlash. Thus, the present invention can provide a precision motion stage with a linear motion that is controlled in an open-loop mode. An open loop linear motion stage greatly reduces the cost and complexity associated with an optical feedback control system for a linear motion stage.

Figure 5:
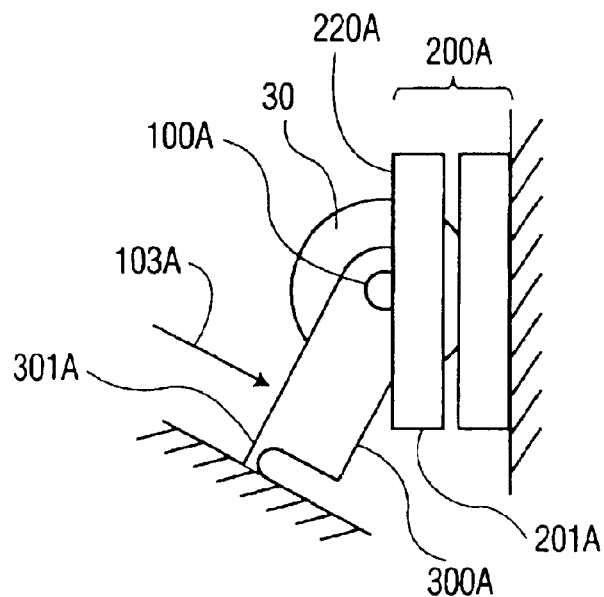
FIG. 5 is a friction drive system according to another exemplary embodiment of the present invention.

Referring now to FIG. 5, a friction drive system using a flexure hinge is shown in accordance with an alternative embodiment of the present invention. The friction drive system of FIG. 5 is similar to the friction drive system in FIG. 2, comprising a drive shaft 100A in frictional contact with a follower 201A which is part of a linear bearing 200A. Drive shaft 100A is coupled to friction surface 220A of bearing 200A by a flexure hinge 301A formed in a support structure 300A. Unlike the friction drive of FIG. 2, however, support structure 300A extends generally parallel to follower 201A.

Pre-load force 103A is applied to support structure 300A such that a moment is created at flexure hinge 301A. Because support structure 300A is generally parallel to follower 201A, the length of support structure 300A provides a moment arm. This moment arm is longer than the moment arm created in the friction drive of FIG. 2. Accordingly, the friction drive of FIG. 5 provides enhanced control of the contact force between drive shaft 100A and follower 201A.

Figure 6:
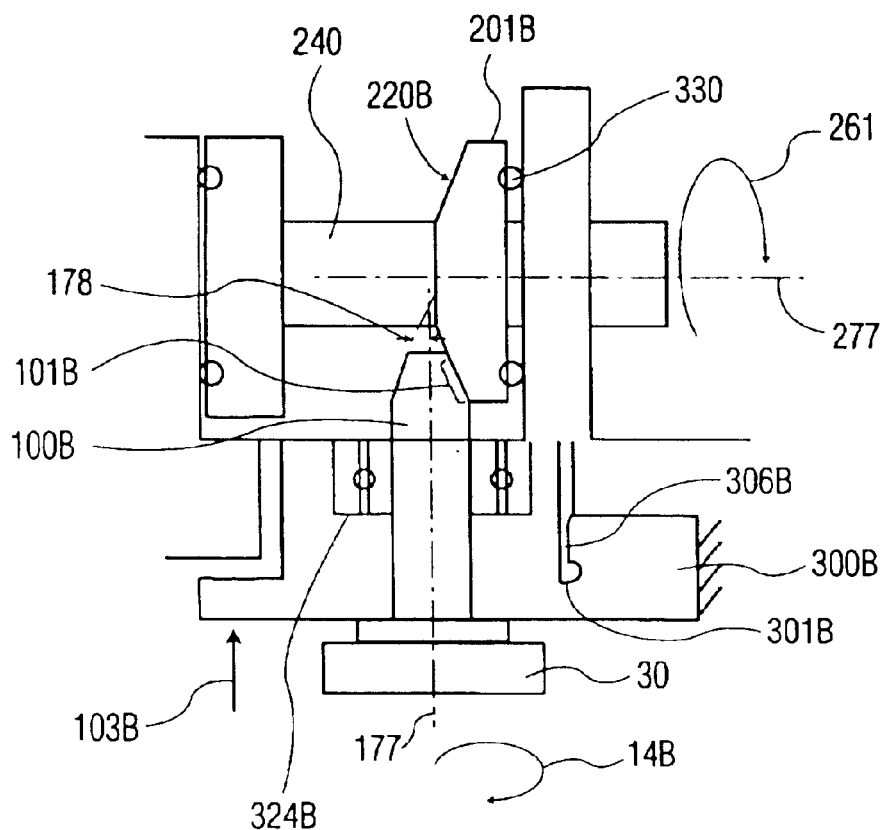
FIG. 6 is a friction drive system according to another exemplary embodiment of the present invention.

In an alternative embodiment of the present invention, as shown in FIG. 6, a friction drive system using a flexure hinge 301B transfers a rotational motion about a first axis 177 to a rotational motion about a second axis 277 perpendicular to first axis 177. A motor 30, such as the rotary ultrasonic motor shown in FIG. 2 and described herein, is mounted on a support structure 300B. Motor 30 is supported at its shaft by a rotary bearing 324B disposed in support structure 300B. A drive shaft 100B is rotated by motor 30 in a direction of rotation 14B. Drive shaft 100B may be attached to the shaft of motor 30, or ideally, may be integral with the shaft of motor 30.

Drive shaft 100B comprises a contact area 101B, which is in frictional contact with a friction surface 220B of a follower 201B. Contact area 101B is tapered inwardly, forming an acute angle 178 with first axis 177. The angle is sized to maintain drive shaft 100B and follower 201B at the same velocity to avoid slippage, and therefore wear. Drive shaft 100B is urged toward friction surface 220B by a pre-load force 103B applied through drive shaft 100B. Pre-load force 103 causes a contact force between drive shaft 100B and friction surface 220B at contact area 101B, which is proportional to the tangent of angle 178 multiplied by pre-load force 103B. The rotation of drive shaft 100B and this contact force cause a frictional force or thrust (not shown) acting on follower 201B to rotate follower 201B in a direction of rotation 261 about second axis 277.

As shown in FIG. 6, drive shaft 100B is coupled to friction surface 220B at contact area 101B by flexure hinge 301B. Flexure hinge 301B comprises an elongated thin wall section formed by creating a slot 306B in support structure 300B. Slot 306B has a width that is large enough to provide a range of motion of shaft 100B at contact area 101B sufficient to compensate for motion errors off of an ideally uniform rotation of follower 201B. Slot 306B, however, has a sufficiently small width to allow bending and avoid buckling of the thin wall section of flexure hinge 301B. In an exemplary embodiment of the present invention, slot 306B has a width which is sized to prevent movement of the pivot point of the hinge, to avoid stresses in the hinge that exceed the fatigue stress of the hinge material, and to maximize the stiffness of the hinge to control external noise, while providing a range of motion sufficient to compensate for motion errors in follower 201B without significant variation in the force applied at the contact between drive shaft 100B and follower 201B. Slot 306B may be terminated with a rounded opening to reduce stress concentrations. The thickness of the remaining thin wall section of flexure hinge 301B may be varied depending upon the forces acting on it, such as the weight of motor 30 and pre-load force 103B, but ideally would be sufficient to allow a range of bending motion when pre-load force 103B is applied.

Flexure hinge 301B allows movement at contact area 101B of drive shaft 100B in the direction of pre-load force 103B, varying the contact force between drive shaft 100B and follower 201B. Movement of contact area 101B of drive shaft 100B is restrained, however, in the direction of the thrust exerted by drive shaft 100B by flexure hinge 300. This is because the geometry of flexure hinge 300B, an elongated thin wall section, provides much more resistance to a moment about an axis perpendicular to the length of flexure hinge 300B (e.g., movement of the shaft, in the direction of the thrust) than to a moment about an axis along the length of flexure hinge 300B (e.g., movement of the shaft in the direction of pre-load force 103B).

Friction surface 220B of follower 201B has the general shape of a truncated conical section. In an exemplary embodiment, this conical section has an angle of taper that is complimentary with angle 178. A follower shaft 240 is coupled to follower 201B such that rotation of follower 201B rotates follower shaft 240 in direction of rotation 261. Follower shaft 240 may be fixed to follower 201B or integral with follower 201B. Follower 201B and follower shaft 240 are mounted with a thrust bearing 330. Follower shaft 240 may be used, for example, to provide precision angular motion for a goniometric stage (not shown). The goniometric stage may be integral with follower shaft 240 or may be in frictional contact with follower shaft 240.

Drive shaft 100B and Follower 201B are sized such that the diametric ratio of the follower to the shaft is greater than 1. As the diameter of follower 201B is increased with respect to the diameter of drive shaft 100B, the angular error at follower shaft 240 is reduced. In an exemplary embodiment, the diametric ratio of follower 201B to drive shaft 100B is about 4.0. This diametric ratio and the resulting reduction in angular error is useful for applications such as a goniometric stage used for aligning optical components.

Figure 7:
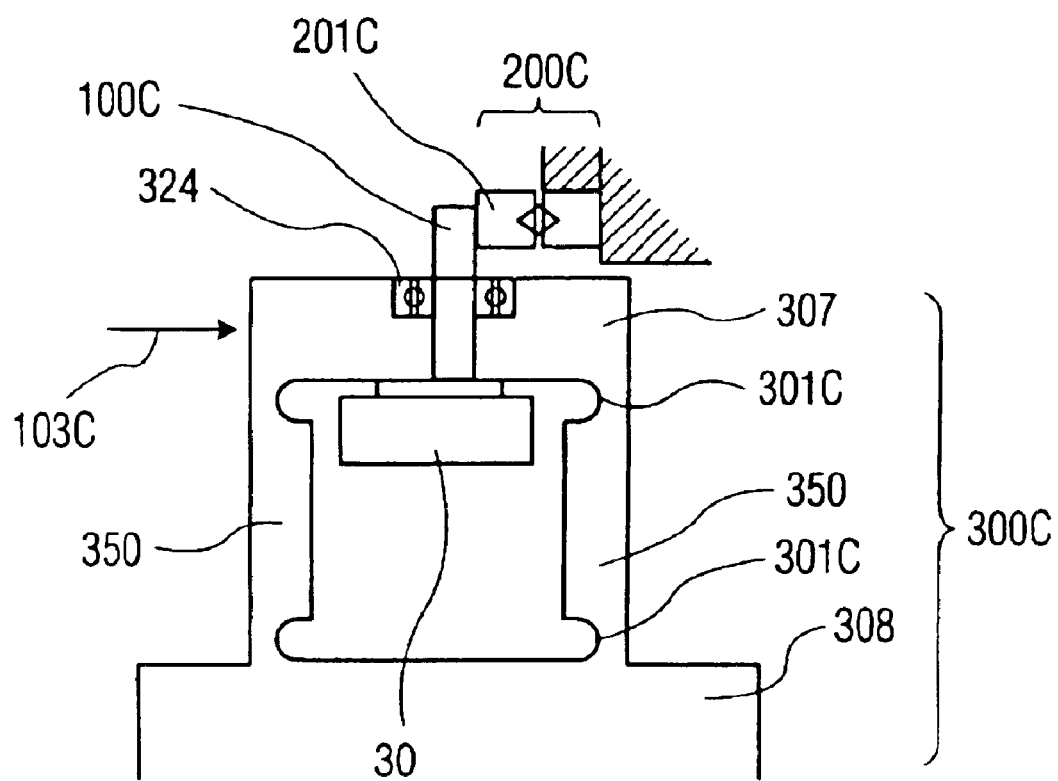
FIG. 7 is a friction drive system according to another exemplary embodiment of the present invention.

In another alternative embodiment of the present invention, as shown in FIG. 7, a friction drive system in which a drive shaft 100C is coupled to a follower 201C by parallel links 350 comprising four flexure hinges 301C. Motor 30 is mounted to a mounting portion 307 of a support structure 300C with a rotary bearing 324. Mounting portion 307 is supported by two parallel links 350. Mounting portion 307 is connected to each parallel link by a flexure hinge 301C. The parallel links 350 are each connected to a base portion 308 of support structure 300C by a flexure hinge 301C.

As shown in FIG. 7, a drive shaft 100C, rotated by motor 30, is in frictional contact with follower 201C, which may be a cross roller way of a linear bearing 200C. A pre-load force 103C is applied to support structure 300C such that it urges drive shaft 100C toward follower 201C. Pre-load force 103C maintains a uniform contact force between drive shaft 100 and follower 201C over motion errors during the travel of follower 201C by opening and closing flexure hinges 301C to shift mounting portion 307 and drive shaft 100C. Because parallel links 350 are essentially equal in length, they remain parallel as mounting portion 307 and drive shaft 100C shift. Accordingly, the contact angle between drivie shaft 100C and follower 201C remains uniform.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. A friction drive comprising:
   a drive shaft in rotational motion having a contact area for transferring a thrust through frictional contact at the contact area;
   a linear follower in frictional contact with the drive shaft at the contact area for receiving the thrust and providing linear motion in response to the thrust; and
   a flexure hinge for coupling the drive shaft to the follower with a constant force while restraining movement of the contact area in the direction of the thrust.

2. The friction drive of claim 1 further comprising a rotary ultrasonic motor for providing rotational impulses to the drive shaft.

3. The friction drive of claim 1 further comprising a means for providing a uniform pre-load force to the drive shaft at the contact area.

4. The friction drive of claim 3 wherein the means for applying a uniform pre-load force to the drive shaft at the contact area is a spring coupled to the flexure hinge.

5. A precision motion stage comprising:
   a drive shaft for transferring a rotational force to a linear stage through frictional contact at a contact area;
   a linear bearing having a cross roller way integral with the linear stage and having a surface in frictional contact with the drive shaft at the contact area for providing linear motion to the linear stage in response to frictional contact with the drive shaft; and
   a flexure hinge for coupling the drive shaft to the cross roller way with a constant force while restraining movement of the contact area in the direction of the linear motion.

6. The precision motion stage of claim 5 further comprising a rotary ultrasonic motor wherein the rotational force is provided to the drive shaft by the ultrasonic motor.

7. The precision motion stage of claim 6 further comprising a support structure supporting the motor wherein the flexure hinge is formed in the support structure.

8. The precision motion stage of claim 7 further comprising a motor shaft wherein the drive shaft is directly coupled to the motor shaft.

9. The precision motion stage of claim 7 further comprising a motor shaft wherein the drive shaft is integral with the motor shaft.

10. The precision motion stage of claim 5 wherein the linear motion of the linear motion stage is controlled in an open-loop mode.

11. The precision motion stage of claim 7 further comprising a means for applying a uniform pre-load force to the drive shaft at the contact area.

12. The precision motion stage of claim 11 wherein the means for applying a uniform pre-load force to the drive shaft at the contact area is a spring coupled to the flexure hinge.

13. The precision motion stage of claim 11 further comprising a stationary frame wherein the flexure hinge is fastened to the stationary frame with at least one bolt and the means for applying a uniform pre-load force to the drive shaft at the contact area is a spring washer positioned between the at least one bolt and the support structure.

14. The precision motion stage of claim 5 further comprising a rotary bearing disposed in a support structure, wherein the rotary bearing supports the drive shaft and the flexure hinge comprises a slot formed in the support structure.

15. The precision motion stage of claim 14 wherein the pre-load force is applied perpendicular to the slot.

16. The precision motion stage of claim 14 wherein the pre-load force is applied parallel to the slot.

17. The precision motion stage of claim 5 further comprising parallel links of equal length connected at their tops and bottoms by flexure hinges wherein the pre-load force is applied to the parallel links such that the contact area remains parallel to surface in frictional contact with the drive shaft.

18. A friction drive comprising:
   a drive shaft in rotational motion about a first axis of rotation and having a contact area for transferring a thrust through frictional contact at the contact area;
   a follower having a surface in frictional contact with the drive shaft at the contact area for receiving the thrust and providing rotational motion in response to the thrust about a second axis of rotation substantially perpendicular to the first axis of rotation; and
   a flexure hinge for coupling the drive shaft to the follower with a constant force while restraining movement of the contact area in the direction of the thrust.

19. The friction drive of claim 18 wherein the diametric ratio of the follower to the shaft is greater than 1 to provide a reduction in angular error.

20. The friction drive of claim 18 wherein the contact area of the shaft is offset from the first axis of rotation by an acute angle and the surface of the follower in frictional contact with the contact area is offset from the second axis of rotation by an acute angle.

21. The friction drive of claim 20 wherein the offset angle of the contact area and the offset angle of the follower surface are complimentary angles.

* * * * *